3 Sheets—Sheet 1.
A. T. NORD.
HARVESTER.
No. 178,185.  Patented May 30, 1876.
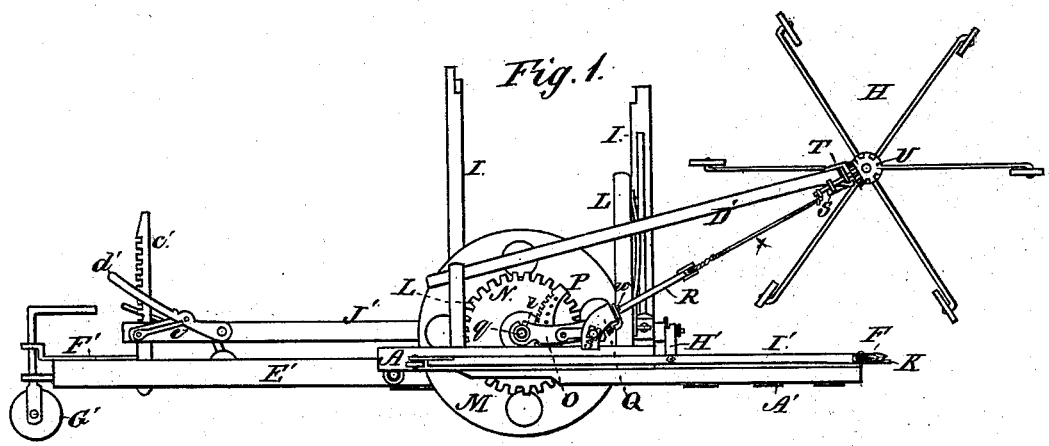
Fig. 1.
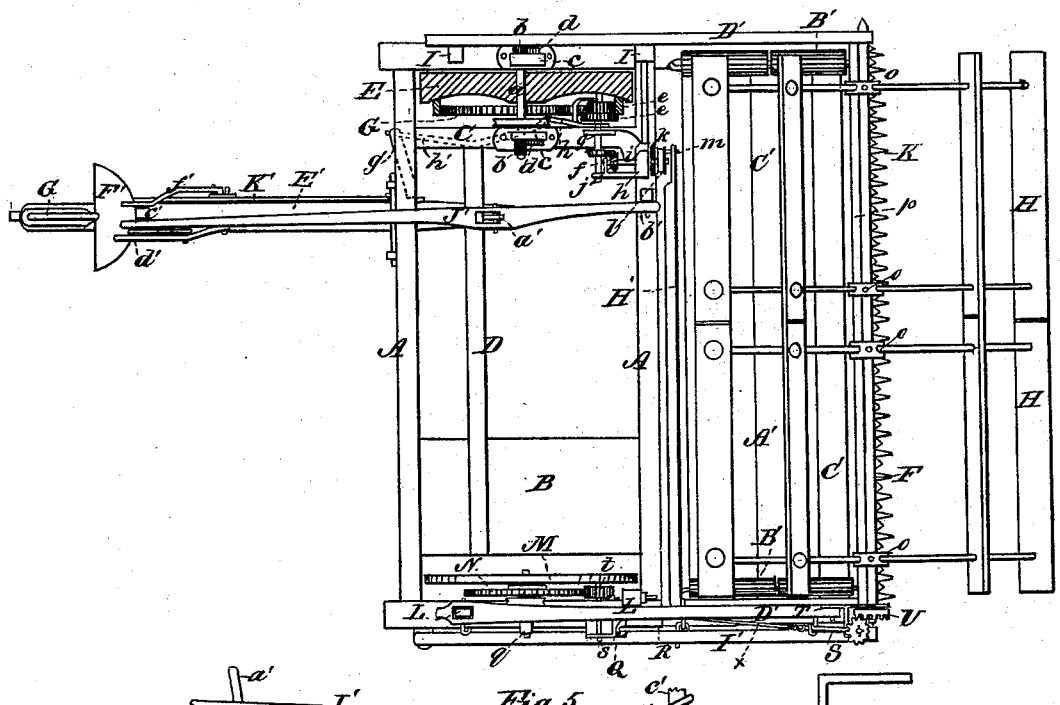
Fig. 2.
Fig. 5.
WITNESSES:  INVENTOR:

3 Sheets—Sheet 2.
A. T. NORD.
HARVESTER.
No. 178,185. Patented May 30, 1876.
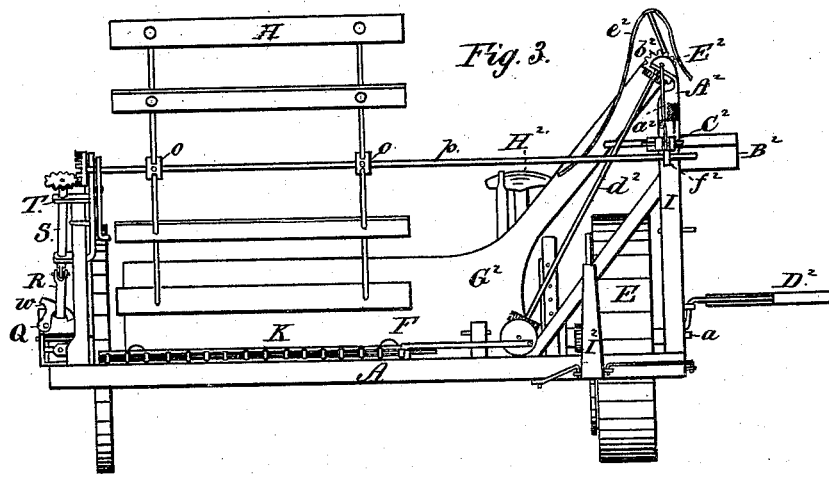
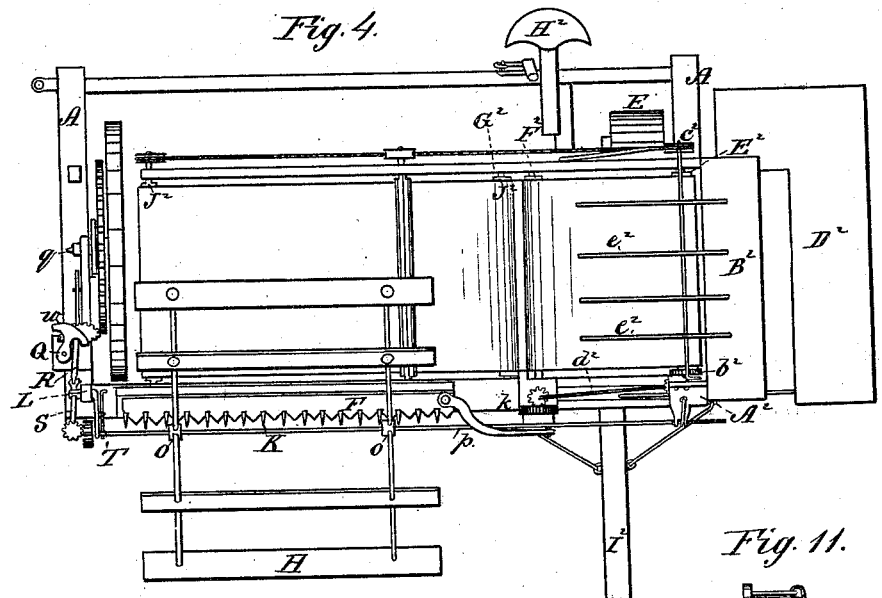
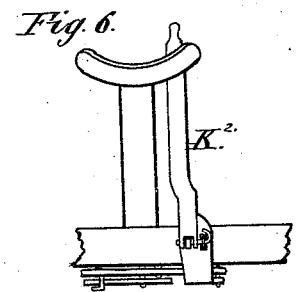
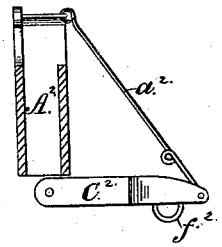
WITNESSES:
INVENTOR:
A. T. Nord
BY
ATTORNEYS.
N. PETERS, PHOTO-LITHOGRAPHER, WASHINGTON, D. C.

3 Sheets—Sheet 3.

A. T. NORD.
HARVESTER.

No. 178,185.

Patented May 30, 1876.

WITNESSES:

INVENTOR:
A. T. Nord
BY

ATTORNEYS.

N. PETERS, PHOTO-LITHOGRAPHER, WASHINGTON, D. C.

UNITED STATES PATENT OFFICE.

ANDREW T. NORD, OF FREMONT, NEBRASKA.

IMPROVEMENT IN HARVESTERS.

Specification forming part of Letters Patent No. 178,185, dated May 30, 1876; application filed February 29, 1876.

*To all whom it may concern:*

Be it known that I, ANDREW T. NORD, of Fremont, in the county of Dodge and State of Nebraska, have invented a new and Improved Combined Header and Harvester; and I do hereby declare that the following is a full, clear, and exact description of the same, reference being had to the accompanying drawings, forming part of this specification, in which—

Figure 7:
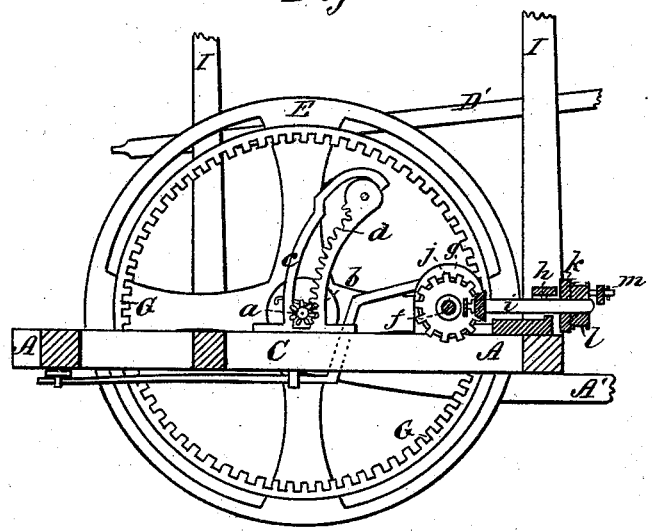
Figure 8:
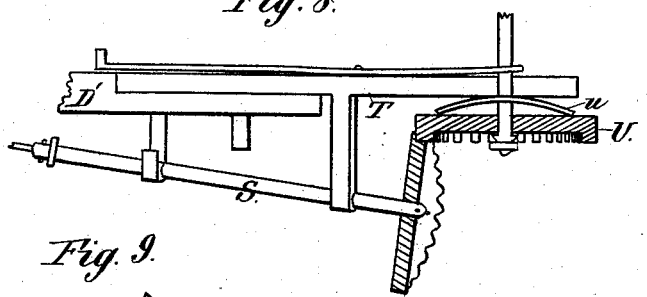
Figure 9:
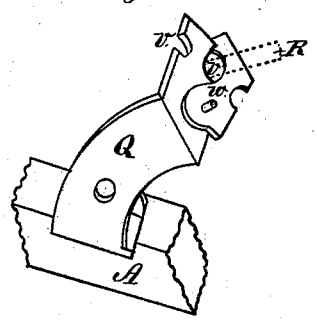
Figure 10:
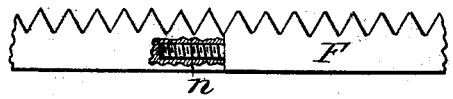

Figure 1 is a side elevation of the device arranged as a header; Fig. 2, a plan view of the same, with the main driving-wheel in section; Fig. 3, a front elevation of the device arranged as a harvester; Fig. 4, a plan view of the same, with the apron passing around the roller; Fig. 5, a detail of the header-tongue, showing shifting devices for changing speed; Fig. 6, detail of devices for changing speed when used as a harvester; Fig. 7, enlarged cross-section of main frame through line $z\ z$ of Fig. 2; Fig. 8, enlarged detail of reel-connection; Fig. 9, enlarged detail of bearing for reel-connecting shaft, which is shown in dotted lines; Fig. 10, enlarged detail, showing sectional character of sickle. Fig. 11 is a detail view of the socket $A^2$ and its attached block.

The object of my invention is to provide a new and improved construction of harvester designed to adapt the implement to a more general and extended use. It consists in the peculiar construction and arrangement of parts, whereby the machine is adapted to be used either as a header for cutting off the heads of the grain, or as a harvester for cutting off both heads and stalks, and for these different uses is readily convertible at will.

In the different figures of the drawing the simple letters indicate the parts in common to both the header and harvester; the letters marked $x^1$ indicate the parts belonging exclusively to the header, and the letters marked $x^2$ indicate the parts belonging exclusively to the harvester.

The implement as arranged for a header, and represented in Figs. 1 and 2, will first be described.

A represents the rectangular main frame in dimensions of about five feet by nine feet, made of any suitable-sized material, and put together in any approved way. Inside this frame is arranged the transverse board B and bar C, and the longitudinal bar D connecting B and C. Between the bar C and the end of the main frame is journaled the driving-wheel E, which operates the sickle-bar F. The driving-wheel E is made to revolve freely upon a shaft, $a$, carrying at its ends pinions $b\ b$. Said shaft is located and held upon both sides in curved guides $c\ c$, Figs. 2 and 7, which are provided with similarly-curved rack-bars $d\ d$, with which the pinions upon the shaft mesh. The object of this arrangement is to raise or lower the main frame upon the running wheels for high or low grain, or for the different uses of the machine. When adjusting the said shaft $a$ the pinions are moved up and down upon the curved rack-bar, and the shaft $a$ is held in a fixed position by means of bolts which pass through adjusting-holes in the curved guides $c\ c$. G is a gear-wheel affixed to the main driving-wheel E, and having interiorly-projecting teeth which engage with the pinions $e\ e$ upon shaft $f$. This shaft is the center of a true circle, of which the curved guides form an arc, so that in all positions of the shaft $a$ of wheel E the connection and engagement of gear-wheel G with the pinions $e\ e$ is perfectly made. These two pinions $e\ e$ are attached to shaft $f$, so as to slide loosely on it, but revolve with it, and they are made of different sizes and provided with a shifting device, so as to give a faster or slower motion, according as the implement is to be used as a harvester or header. The shaft $f$ is journaled in a bearing, $g$, which is, preferably, made of one and the same piece with the curved guides, and also in bearing $h$, which carries the shaft $i$ at right angles to $f$. Said shafts $f$ and $i$ are connected by a bevel-gear, $j$, and $i$ carries upon its end a pinion, $k$, (with which the elevator devices of the harvester are connected,) a pulley, $l$, and a crank or wrist-pin, $m$. The latter is attached to the pitman $H^1$ parallel with the sickle, and the said pitman is jointed to the middle of a lever, $l^1$, upon the side of the machine, which lever is pivoted at one end to the frame A and at the other to the sickle F, so as to operate the latter with a reciprocating movement. The said sickle is made in two sections, Fig. 10, with a screw, $n$, on one piece and a socket in the other.

The finger-bar K is also made in sections, and the object of this arrangement is to adapt a portion of the sickle and finger-bar for use on the harvester, in which connection a shorter length is required. The said sickle and finger-bar are fastened upon the outer portion of a frame, $A^1$, which latter is screwed to the under side of frame A, Figs. 1 and 7, and is provided with rollers $B^1$ $B^1$. Around said rollers, and resting upon the slats C', is arranged an endless apron, which receives and carries away the heads of grain cut off by the sickle. These rollers may be rotated by a band connected with pulley $l$ upon the shaft to which the pitman is attached, or in any other suitable manner.

H is the reel, consisting of radial arms and longitudinal bars attached to collars $o$, that slide upon and are fastened to a shaft, $p$, by means of binding-screws. This reel is thus made in two detachable sections for the same reason that the sickle is made in sections—i.e., to adapt it to use upon the machine when used as a harvester and a shorter length of reel required. The said shaft $p$ constitutes the axis of the reel, and it is pivoted in the vertically-adjustable reel-supporting arms $D^1$ $D^1$, which are detachably fastened, by means of bolts, to the standards I I and L L at opposite ends of the main frame. In the opposite end of the main frame from wheel E is journaled the other running and driving wheel M, which operates the reel. It is pivoted upon a shaft, $q$, which carries a pinion, $r$, and gear-wheel N. The shaft is journaled in a circularly-moving bearing, O, which is pivoted upon a shaft, $s$, carrying a pinion, $t$. This shaft is the center of a true circle, of which the curved rack-bar P is an arc, so that for all positions the gear-wheels N and $t$ are connected. The shaft $q$ is held fixedly in its adjustment by means of holes in the rack P, and a pin passing through them.

Q, Figs. 1 and 9, is a metallic frame, forming a bearing for shaft $s$ and also for a shaft, R, carrying a pinion that meshes at right angles with pinion $t$. Said frame Q is provided with two open bearings, $v$, in which the shaft R rests in its different positions for the header and harvester. Near these open bearings is pivoted a retaining-hook, $w$, which closes over one or the other of the open bearings to hold the shaft in position. Shaft R is connected by means of a loose detachable connecting-rod, $x$, with a short shaft, S, held in a loosely-pivoted bearing-plate, T, Fig. 8, on the end of the reel-supporting arm, and carrying a pinion, which engages with and revolves the crown-wheel U of the reel-shaft. Said reel-shaft is pivoted in an open bearing in the plate T, which bearing is provided with a pivoted latch to close said bearing. This arrangement permits the removal of the reel-shaft from its supporting-arms for the purpose hereinafter described.

To avoid breakage from a sudden stoppage of the reel, and prevent strain upon the gearing, I place upon the reel-shaft, between its bearing-plate and the crown-wheel, a spring-friction disk, $u$, against which the crown-wheel is pressed by means of a screw-nut. With this arrangement, when the machine and its gearing suddenly stops, the reel is not exposed to the strain of sudden stoppage, but stops gradually by reason of the friction-disk, which operates a brake.

$E^1$ is the tongue of the header, attached to the rear of the main frame, or upon the opposite side from the sickle. Said tongue is pivoted or hinged to the frame, so as to move vertically, and is provided upon its outer or rear end with a platform, $F^1$, upon which the driver stands, and a swiveling guide-wheel, $G^1$. To the opposite end of the tongue, beyond its pivots, is a rigidly-attached and vertically-projecting standard, $a'$, Fig. 5, to which is pivoted an adjusting-lever, $J^1$. This lever is slotted at $b^1$, Fig. 2, and is connected with the main frame by means of a bolt passing through said slot. This lever is employed for varying at will from time to time the height of the sickle to suit the inequalities of the ground and the varying heights of the grain. The rear end of the lever is provided with locking devices within the reach and control of the driver, which consists of a notched upright bar, $c^1$, attached to the tongue, a hand-lever, $d^1$, a crank-piece pivoted to the said lever at one end, and sliding so as to engage the notches at the other, and a spring, $e^1$, for holding the locking crank-piece in the notches.

The devices for shifting the pinions of the main gear-wheel for altering the speed of the sickle are extended beside the tongue to within a convenient reach of the driver, Figs. 2 and 5, and they consist of a bar, $K^1$, extending alongside of the tongue and operated by the driver longitudinally through a bent lever, $f^1$. This lever is pivoted to the tongue through a slot in the bar, which slot operates as a guide for the bar, and when said lever is deflected it bears against studs upon a metallic plate attached to the bar and moves it longitudinally. The opposite end of the bar is also slotted, so as to move over a guide-pin, and is pivoted to one end of a lever, $g'$. The other end of this lever bears against and deflects a lever, $h'$, one end of which is bent and connected with lever $g'$, and the other end of which is forked, and incloses the two different sized pinions, $e$ $e$, which are alternately made to engage with the gear-wheel G according as a fast or slow motion is required.

With the machine arranged for a header, as hereinbefore described, the horses are attached to the tongue in the rear of the machine with their heads toward the sickle, and the machine thus advanced and operated to cut off the heads of the grain.

When the machine is to be converted into a harvester, Figs. 3 and 4, the following changes are made: First, detach the tongue with lever $J^1$ and bar $K^1$; then remove frame A¹, carrying sickle, and also the pitman and lever operating the same; next, break the reel-driving connection, and remove the reel-supporting arms from their standards. Upon the standard I, next to the sickle-bar, is then placed the metallic cap $A^2$, Figs. 11 and 3, fitting over the end of the standard like a socket, and carrying a bearing at the top for the elevator-roller. The binders' table $B^2$ is then attached to the sides of the standards I I by means of rods which pass through said standards and support the table. One of the rods passes through, also, a block, $C^2$, carrying a bearing for the harvester-reel. This block is connected with the cap $A^2$ by means of a loose-jointed rod, $a^2$, which braces block $C^2$ and holds the cap down firmly. Just below the binders' table is a stand, $D^2$, which is attached to the standards I I by means of bent rods which pass through eyes upon the standards. A roller, $E^2$, carrying a gear-wheel, $b^2$, and a pulley, $c^2$, is then fixed in bearings in the top of one standard and the cap of the other, and its gear-wheel connected with wheel $k$ of the pitman driving-shaft by a vertical rod, $d^2$, having pinions upon each end. This mechanism drives an endless elevator-apron, which passes around rollers $E^2$ $F^2$, and carries off the cut grain to the binder. Just above the roller $E^2$ is arranged a set of spring-fingers, $e^2$, which receive the grain from the apron and separate it therefrom, so as to be freely delivered upon the binders' table. These fingers are arranged upon a rod, one end of which is detachably fastened to one of the standards, and the other end of which is attached to an inclined brace-board, $G^2$, which is adjustably fastened by studs to the bar D of the main frame. The sickle and finger bar are then unscrewed, and a section of each is disposed alongside the longitudinal bar of the main frame A and connection made between the sickle and the wrist-pin of the actuating-shaft. The reel is then divested of one of its sections and the shaft adjusted in new bearings for the harvester arrangement. To do this the shaft R is removed from its previous open bearing in the frame Q and placed in the upper open bearing, and there held by the hook $w$.

The connecting-rod $x$ is then removed, and the bearing-plate T taken from the reel-supporting arm and attached to the standard L, next to the sickle. The reel-shaft with its single section of the reel is then arranged in its proper place above the sickle by placing one end in the plate T in its new position, and the other end in the bearing $f^2$ of block $C^2$. A seat, $H^2$, for the driver is then placed upon the rear portion of the main frame, and a tongue, $I^2$, of simple construction, attached to the opposite side of the main frame near the end of the sickle-bar. $J^2$ $J^2$ are rollers pivoted in the main frame around which passes an endless apron, which passes just in the rear of the sickle and conveys the cut grain to the elevator-apron. This apron is rotated by a band passing around a pulley upon one of the rollers and connecting with the pulley of the elevator-roller.

To enable the driver to regulate the speed of the harvester, a new shifting-lever, $K^2$, is pivoted to the main frame within easy reach of his seat, and connected at its lower end with the lever which operates the shifting-lever.

The parts herein before designated by the letters marked $x^2$, I am aware, have no necessary connection with the header and cannot be claimed in this application; but I have described the same for the purpose of showing the adaptation of my header to use as a harvester with certain changes and additional supplemental devices.

Having thus described my invention, what I claim as new is—

1. The sickle F, divided transversely in two sections, one of which is provided with a screw-stem, and the other with a screw-socket, for the purpose of adapting the sickle to use either upon the harvester or header, as described.

2. The combination, with the main frame A and the sectional sickle and finger-bar, of the reel H, consisting of two sections of radial arms and slats attached to collar $o$, which are detachably fastened to a shaft, $p$, by binding-screws, for the purpose described.

3. The combination, with the shaft $s$ and the shaft R, connected by gear-wheels, of the metallic frame Q, having the open bearings $v$ and the pivoted retaining-hook $w$, as described.

4. The combination of the frame Q, having bearings $v$ and hook $w$, the shaft R, the loosely-jointed connecting-rod $x$, the shaft S, the detachable bearing-plate T, and the reel-shaft connected with shaft S by gear-wheels, as and for the purpose described.

5. The combination of the reel-shaft having a rigidly attached friction disk or spring, $u$, with the gear-wheel U secured thereto by frictional contact through a screw-nut, for the purpose of taking up the momentum of the reel when the machine is suddenly stopped, as described.

6. The combination, with the tongue $E^1$, of the bent lever $f^1$, the bar $K^1$ extended alongside of the tongue, the lever $g'$ and the forked lever $h'$ embracing the pinions $e$ $e$, substantially as and for the purpose described.

7. The pitman H located at the junction of frames A $A^1$ and connected with the wrist-pin of the actuating-shaft at one end and the lever $I^1$ at the other, in combination with the sickle and the lever I, located upon the outside of the frame-work and pivoted at one end to frame A, at the other to the sickle, and to the pitman H in the middle, substantially as and for the purpose described.

ANDREW T. NORD.

Witnesses:
 ASBURY TOWNSEND,
 WILLIAM MARTIN.